(12) United States Patent
Kobayashi

(10) Patent No.: US 10,181,593 B2
(45) Date of Patent: *Jan. 15, 2019

(54) SECONDARY BATTERY AND SEPARATOR USED THEREIN

(71) Applicant: W. L. Gore & Associates, Co., Ltd., Tokyo (JP)

(72) Inventor: Kotaro Kobayashi, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/314,212

(22) PCT Filed: May 26, 2015

(86) PCT No.: PCT/JP2015/065120
§ 371 (c)(1),
(2) Date: Nov. 28, 2016

(87) PCT Pub. No.: WO2015/182615
PCT Pub. Date: Dec. 3, 2015

(65) Prior Publication Data
US 2017/0155116 A1    Jun. 1, 2017

(30) Foreign Application Priority Data

May 26, 2014 (JP) .................. 2014-108233

(51) Int. Cl.
*H01M 2/16* (2006.01)
*H01M 2/34* (2006.01)
(Continued)

(52) U.S. Cl.
CPC .......... *H01M 2/1686* (2013.01); *H01M 2/16* (2013.01); *H01M 2/166* (2013.01);
(Continued)

(58) Field of Classification Search
CPC .. H01M 2/166; H01M 2/1686; H01M 2/1653; H01M 2/34; H01M 2200/00
See application file for complete search history.

(56) References Cited

U.S. PATENT DOCUMENTS 3,962,153 A    6/1976    Gore
4,187,390 A    2/1980    Gore
(Continued)

FOREIGN PATENT DOCUMENTS

CN    101752539 A    6/2010
JP    H5-258741 A    10/1993
(Continued)

OTHER PUBLICATIONS

English translation of JP Publication H08-250101, Sep. 1996.*
International Search Report and Written Opinion for PCT/JP2015/065120 dated Sep. 1, 2015.

*Primary Examiner* — Brittany L Raymond
(74) *Attorney, Agent, or Firm* — Greenberg Traurig, LLP

(57) ABSTRACT

Problem to be Solved
An object of the present invention is to provide a secondary battery that is able to inhibit the growth of a dendrite that can generate from an electrode comprising alkali metal and a separator used therein.
Solution
A secondary battery, comprising:
a positive electrode;
a negative electrode comprising alkali metal;
a separator comprising a layer of tetrafluoroethylene (TFE) polymer or copolymer that reacts with a dendrite of the alkali metal, the separator being hydrophilized at a rate of not less than 10% and not more than 80%; and
a layer that does not react with a dendrite of the alkali metal located between the separator and the negative electrode, wherein the standard deviation of opening areas of pores
(Continued)

on the negative electrode side surface of the layer that does not react with a dendrite of the alkali metal is 0.1 µm² or less, and a separator used therein.

18 Claims, 2 Drawing Sheets

(51) Int. Cl.
*H01M 4/38* (2006.01)
*H01M 10/052* (2010.01)
*H01M 10/054* (2010.01)
*H01M 10/058* (2010.01)
*H01M 10/42* (2006.01)

(52) U.S. Cl.
CPC ........... *H01M 2/1653* (2013.01); *H01M 2/34* (2013.01); *H01M 4/381* (2013.01); *H01M 10/052* (2013.01); *H01M 10/054* (2013.01); *H01M 10/058* (2013.01); *H01M 10/4235* (2013.01); *H01M 2200/00* (2013.01); *H01M 2220/30* (2013.01); *H01M 2300/0082* (2013.01); *H01M 2300/0094* (2013.01); *Y02T 10/7011* (2013.01)

(56) References Cited

U.S. PATENT DOCUMENTS

| 5,427,872 | A | * | 6/1995 | Shen | ................. | H01M 2/14 |
|---|---|---|---|---|---|---|
| | | | | | | 429/142 |
| 2003/0049538 | A1 | | 3/2003 | Buerger et al. | | |
| 2006/0222955 | A1 | | 10/2006 | Ogawa et al. | | |
| 2011/0159346 | A1 | | 6/2011 | Yamamoto et al. | | |
| 2014/0170465 | A1 | * | 6/2014 | Visco | ................. | H01G 11/06 |
| | | | | | | 429/144 |
| 2014/0272489 | A1 | * | 9/2014 | Anandan | ............ | H01M 2/348 |
| | | | | | | 429/61 |
| 2014/0329130 | A1 | * | 11/2014 | Kanamura | ............ | H01M 2/145 |
| | | | | | | 429/144 |
| 2015/0303429 | A1 | | 10/2015 | Kobayashi | | |

FOREIGN PATENT DOCUMENTS

| JP | H6-168737 A | | 6/1994 |
|---|---|---|---|
| JP | H08-250101 | * | 9/1996 |
| JP | H8-250101 A | | 9/1996 |
| JP | H9-293492 A | | 11/1997 |
| JP | 3463081 B2 | | 11/2003 |
| JP | 2007-149507 A | | 6/2007 |
| JP | 2010-61974 A | | 3/2010 |
| WO | WO 2013-084368 | * | 6/2013 |
| WO | WO-2013/084368 A1 | | 6/2013 |

* cited by examiner

Life until short vs S.D. of surface pore area

SECONDARY BATTERY AND SEPARATOR USED THEREIN

The present application is a U.S. national-stage entry of PCT/JP2015/065120, filed on May 26, 2015, and claims priority to Japanese Pat. Appl. No. 2014-108233, filed on May 26, 2014, which applications are incorporated herein by reference in their entirety.

TECHNICAL FIELD

The present invention relates to a secondary battery and a separator used therein. More particularly, the present invention relates to a secondary battery that is able to inhibit the growth of a dendrite that can generate from an electrode comprising alkali metal and a separator used therein.

BACKGROUND ART

In recent years, portable cordless products such as a CD player, multimedia player, cellular phone, smartphone, notebook personal computer, tablet device, and video camera have been increasingly miniaturized and made portable. Further, from the standpoint of environmental issues such as air pollution and increased carbon dioxide, hybrid vehicles and electric vehicles have been developed and are at the stage of practical use. Such electronics and electric vehicles require an excellent secondary battery having characteristics such as high efficiency, high output, high energy density, and light weight. As a secondary battery having such properties, various secondary batteries have been developed and researched.

A chargeable and dischargeable secondary battery generally has a structure that prevents direct electrical contact between a positive electrode and a negative electrode by separating the positive electrode (cathode) and the negative electrode (anode) with a porous polymer membrane comprising an organic electrolyte solution.

Until now, $V_2O_5$, $Cr_2O_5$, $MnO_2$, $TiS_2$, and the like are known as a positive electrode active material of this non-aqueous electrolyte secondary battery. In addition, in lithium ion batteries that are currently commercialized, $LiCoO_2$, $LiMn_2O_4$, $LiNiO_2$, and the like are used as a 4-V class positive electrode active material.

On the other hand, as a negative electrode, alkali metals including metallic lithium have been studied so much. This is because, in particular, metallic lithium has a very high theoretical energy density (3861 mAh/g by weight capacity density) and a low charge/discharge potential (−3.045 V vs. SHE) and thus is considered to be an ideal negative electrode material.

Then, as an electrolyte solution, for example, a lithium salt dissolved in a nonaqueous organic solvent is used, which salt has good ionic conductivity and negligible electrical conductivity. During charging, lithium ions move from the positive electrode to the negative electrode (lithium). During discharging, the lithium ions move in the reverse direction back to the positive electrode.

However, using lithium metal as a negative electrode has the following problem. Dendritic lithium (lithium dendrite) precipitates on the lithium surface of the negative electrode during charging. The dendritic lithium grows as the charge and discharge is repeated, causing, for example, detachment from the lithium metal to thereby reduce cycle characteristics. In the worst case, the dendritic lithium grows to the extent that it breaks through the separator, causing a short circuit of a battery, which can cause firing of the battery.

Thus, to use lithium metal as a negative electrode, the problem of lithium dendrite needs to be solved.

Thus, various carbonaceous materials, metals such as aluminum, alloys or oxides thereof, and the like that are able to occlude and release lithium have been studied so much.

However, using these negative electrode materials reduces the capacity as a battery while it is effective for inhibiting the growth of a lithium dendrite.

Consequently, the research and development for using metallic lithium as a negative electrode has still been actively conducted, and a number of improvements such as development of an electrolyte solution and study of a battery-constituting method have been made.

For example, Patent Document 1 (JP 05-258741 A) proposes using a separator with a smaller pore size than that of conventional ones so that a crystal that grows from the negative electrode side does not grow at pore portions in order to inhibit the growth of such a dendritic crystal (dendrite).

Also, Patent Document 2 (JP 09-293492 A) proposes using an expanded porous polytetrafluoroethylene (PTFE) membrane as a battery separator with high porosity, mechanical strength, and heat resistance and treating the surface and internal pore surface of the expanded porous PTFE membrane to modify these surfaces to a hydrocarbon or carbon oxide compound and cover them. This is because lithium metal reacts with PTFE. Namely, the separator (PTFE) is in contact with the whole surface of a negative electrode (lithium), and consequently a reaction occurs at the electrode/separator interface, whereby the lithium electrode surface is covered with a reaction product, which adversely affects the electrolysis/precipitation of the lithium. To solve this problem, Patent Document 2 describes that the reaction between lithium and a PTFE substrate can be prevented by treating the surface and internal pore surface of the expanded porous PTFE membrane to modify these surfaces to a hydrocarbon or carbon oxide compound and cover them.

Further, Patent Document 3 (U.S. Pat. No. 5,427,872) discloses a lithium electrode (anode) secondary battery comprising a first porous separator and a second separator, wherein the first separator is adjacent to the anode and formed by an aliphatic hydrocarbon resin that does not react with lithium and lithium ions, and the second separator is located between the first separator and the cathode and comprises thermoplastic polytetrafluoroethylene that reacts with lithium metal. There is described that, in this secondary battery, when the tip of a lithium dendrite grows from the anode surface and penetrates the first separator to touch the second separator, the tip of the dendrite and the thermoplastic polytetrafluoroethylene of the second separator causes an exothermic reaction, and the thermoplastic polytetrafluoroethylene dissolves to form non-porous blocked parts, which prevents the dendrite from further growing.

However, a means of more reliably inhibiting the growth of a dendrite is still demanded.

PRIOR ART DOCUMENTS

Patent Documents

Patent Document 1: JP 05-258741 A
Patent Document 2: JP 09-293492 A
Patent Document 3: U.S. Pat. No. 5,427,872

SUMMARY OF THE INVENTION

Problems to be Solved by the Invention

Patent Document 1 to Patent Document 3 described above are all for achieving a secondary battery using lithium metal.

However, the separator with a small pore size of Patent Document 1 cannot completely prevent the growth of a lithium dendrite in principle as long as ions pass therethrough to cause precipitation despite the small pores.

According to Patent Document 2, although the reaction between the electrode (lithium)/the separator (fluorine content) can be prevented, the growth of a lithium dendrite cannot be prevented.

The heating value (theoretical value) of the reaction of a lithium dendrite and polytetrafluoroethylene described in Patent Document 3 is not sufficient to dissolve polytetrafluoroethylene and form non-porous blocks. Actually, retests were carried out, but polytetrafluoroethylene could not be dissolved to form non-porous blocks by this reaction.

In any of the cases, there remains a possibility that a final short circuit between a lithium dendrite and a positive electrode or reduced cycle characteristics due to a detached and isolated lithium dendrite occurs.

Further, in any of Patent Document 1 to Patent Document 3, a hydrophilizing treatment of the separator is neither disclosed nor suggested. Therefore, it can be thought that a hydrophilizing treatment has not been performed in Patent Document 1 to Patent Document 3. An unhydrophilized separator does not provide sufficient battery performance because it does not get wet sufficiently by an electrolyte solution and ions cannot move smoothly.

If by any chance a hydrophilizing treatment of the separator is performed, unless there is a particular reason, it is evident that the separator is completely hydrophilized so that ions can move smoothly and the original battery performance can be obtained. In Patent Documents 1 to 3, such a particular reason is neither disclosed nor suggested. In this case, the separator comprising PTFE in Patent Documents 1 to 3 is completely hydrophilized, i.e., completely covered with a hydrophilizing treatment material, and PTFE (separator) and a lithium dendrite will not cause a reaction.

This means that the invention of Patent Document 3 (PTFE is dissolved by heat of reaction between PTFE and lithium to form blocks) is not valid. In other words, it is considered that a hydrophilizing treatment has not been carried out in the invention of Patent Document 3, and therefore sufficient battery performance cannot be obtained.

Further, Patent Document 2 is also on the assumption that PTFE reacts with lithium, and if hydrophilization is complete, the problem of Patent Document 2 does not exist in the first place. In other words, it is considered that a hydrophilizing treatment has not been carried out also in the invention of Patent Document 2, and therefore sufficient battery performance cannot be obtained.

Patent Document 1, as mentioned above, can not completely prevent the growth of a lithium dendrite in principle. Therefore, if a hydrophilizing treatment is carried out to make PTFE unreactive with lithium, the growth of a dendrite is rather promoted, and it is more likely that the dendrite reaches the cathode to cause a short circuit.

Although the examples using lithium metal were explained in the above, it is known that alkali metals other than lithium also have a very high theoretical energy density and a low charge/discharge potential and can generate a dendrite.

Thus, an object of the present invention is to provide a secondary battery that is certainly able to inhibit the growth of a dendrite that can generate from an electrode comprising alkali metal and a separator used therein.

Means for Solving the Problems

The present invention provides the following aspects.

(1)

A secondary battery, comprising:
a positive electrode;
a negative electrode comprising alkali metal;
a separator comprising a layer of tetrafluoroethylene (TFE) polymer or copolymer that reacts with a dendrite of the alkali metal, the separator being hydrophilized at a rate of not less than 10% and not more than 80%; and a layer that does not react with a dendrite of the alkali metal located between the separator and the negative electrode,
wherein the standard deviation of opening areas of pores on the negative electrode side surface of the layer that does not react with a dendrite of the alkali metal is 0.1 µm² or less.

(2)

The secondary battery according to (1), wherein on the negative electrode side surface of the layer that does not react with a dendrite of the alkali metal, pores having an opening area of less than 0.2 µm² account for 75% or more of the total number of the pores.

(3)

The secondary battery according to (1) or (2), wherein the layer that does not react with a dendrite of the alkali metal is hydrophilized.

(4)

The secondary battery according to any one of (1) to (3), wherein the layer that does not react with a dendrite of the alkali metal is a part of the separator, and, in the layer that does not react with a dendrite of the alkali metal, the inner surface of its pores is at least partially covered with a material that does not react with a dendrite of the alkali metal.

(5)

The secondary battery according to any one of (1) to (3), wherein the layer that does not react with a dendrite of the alkali metal is independent of the separator.

(6)

The secondary battery according to (5), wherein the layer that does not react with a dendrite of the alkali metal comprises any one of glass comprising $SiO_X$ ($0 < x \leq 2$), polyvinylidene fluoride (PVDF), polyimide (PI), polyethylene (PE), or polypropylene (PP) or a mixture thereof.

(7)

The secondary battery according to (5), wherein the layer that does not react with a dendrite of the alkali metal comprises any one of inorganic oxides selected from the group consisting of alumina, titanium oxide, sodium oxide, calcium oxide, boron oxide, potassium oxide, and lead oxide or a mixture thereof and a binder.

(8)

The secondary battery according to any one of (1) to (7), wherein in the layer that does not react with a dendrite of the alkali metal, the inner surface of its pores is covered with a material other than tetrafluoroethylene (TFE) polymer or copolymer.

(9)

The secondary battery according to (8), wherein the material other than tetrafluoroethylene (TFE) polymer or copolymer is any one of glass comprising $SiO_X$ ($0 < x \leq 2$), polyvinylidene fluoride (PVDF), polyimide (PI), polyethylene (PE), or polypropylene (PP) or a mixture thereof.

(10)

The secondary battery according to (9), wherein $SiO_X$ ($0 < x \leq 2$) is applied by Sol-Gel method.

(11)

The secondary battery according to any one of (1) to (10), wherein the tetrafluoroethylene (TFE) polymer or copolymer is expanded or expanded porous.

(12)

The secondary battery according to any one of (1) to (11), wherein the tetrafluoroethylene (TFE) polymer or copolymer is expanded polytetrafluoroethylene, perfluoro alkoxy alkane (PFA), tetrafluoroethylene/hexafluoropropene copolymer (FEP), ethylene/tetrafluoroethylene copolymer (ETFE), or ethylene/chlorotrifluoroethylene copolymer (ECTFE) or a mixture thereof.

(13)

The secondary battery according to any one of (1) to (12), wherein the thickness of the layer that does not react with a dendrite of the alkali metal is 0.1 µm or more.

(14)

The secondary battery according to any one of (1) to (13), wherein the separator at least comprises fluorine that can react with the total mass of the alkali metal constituting the negative electrode.

(15)

The secondary battery according to any one of (1) to (14), wherein the alkali metal is lithium or sodium.

(16)

The secondary battery according to any one of (1) to (15), further comprising a shutdown layer.

(17)

The secondary battery according to (16), wherein the shutdown layer is located between the separator and the positive electrode.

(18)

The separator used in the secondary battery according to any one of (1) to (17).

Effects of the Invention

The present invention provides a secondary battery that is certainly able to inhibit the growth of a dendrite that can generate from an electrode comprising alkali metal and a separator used therein.

BEST MODE FOR CARRYING OUT THE INVENTION

Figure 1:
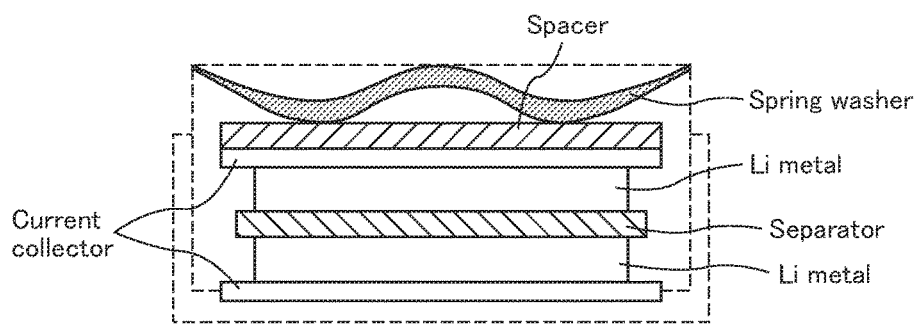
FIG. 1 is a schematic view of a coin cell.

The secondary battery of the present invention is characterized by comprising the following:
a positive electrode;
a negative electrode comprising alkali metal;
a separator comprising a layer of tetrafluoroethylene (TFE) polymer or copolymer that reacts with a dendrite of the alkali metal, the separator being hydrophilized at a rate of not less than 10% and not more than 80%; and a layer that does not react with a dendrite of the alkali metal located between the separator and the negative electrode.

In addition, the secondary battery of the present invention is characterized in that the standard deviation of opening areas of pores on the negative electrode side surface of the layer that does not react with a dendrite of the alkali metal is 0.1 µm² or less.

Secondary batteries are basically composed of a positive electrode/negative electrode and a separator comprising an electrolyte that acts as an ion-conducting medium between the two electrodes.

The negative electrode comprises alkali metal. Alkali metals have a very high theoretical energy density and a low charge/discharge potential and thus are considered to be an ideal negative electrode material. In particular, among the alkali metals, lithium has a very high theoretical energy density (3861 mAh/g by weight capacity density) and a low charge/discharge potential (−3.045 V vs. SHE) and thus is considered to be an ideal negative electrode material.

During charging, ions in the separator move from the positive electrode to the negative electrode. During discharging, the ions move in the reverse direction back to the positive electrode.

During charging, dendritic alkali metal (dendrite) precipitates on the surface of the negative electrode comprising alkali metal. The dendrite grows as the charge and discharge is repeated, causing, for example, detachment from the negative electrode metal to thereby reduce cycle characteristics. In the worst case, the dendrite grows to the extent that it breaks through the separator, causing a short circuit of a battery, which can cause firing of the battery.

The separator serves to prevent a short circuit by separating the positive electrode and the negative electrode and to ensure high ionic conductivity by retaining an electrolyte necessary for cell reaction. The separator comprises a layer of tetrafluoroethylene (TFE) polymer or copolymer. This is because the tetrafluoroethylene (TFE) polymer or copolymer has high porosity, high strength, and excellent heat resistance. This tetrafluoroethylene (TFE) polymer or copolymer contains fluorine. This fluorine is known to react with an alkali metal dendrite according to the following formula:

$$-[CF_2-CF_2]-_n+4nA \rightarrow =[C=C]=_n+4nAF$$

wherein A means alkali metal.

It has been believed that, in tetrafluoroethylene (TFE) polymer or copolymer, once the fluorine contained reacts with alkali metal, defluoridation (i.e., carbonization) occurs, and high porosity, high strength, and heat resistance cannot be maintained. On the contrary, the present inventor arrived at the idea of taking advantage of the characteristics of this fluorine to react with alkali metal. Namely, the present invention has been completed based on a novel idea of the present inventor that the growth of a dendrite can be inhibited by reacting fluorine with the dendrite of alkali metal.

The tetrafluoroethylene (TFE) polymer or copolymer constituting the separator is fluororesin and hydrophobic in itself. However, the separator must be those in which ions existing in an electrolyte solution (aqueous solution, organic solvent, and the like) are able to pass through a porous body or fibers of the separator and move from one place to the other place separated by the separator. Accordingly, the tetrafluoroethylene (TFE) polymer or copolymer constituting the separator is subjected to a hydrophilizing treatment. The hydrophilizing treatment must be carried out sufficiently such that the separator has hydrophilicity and that the interior of the separator is made wet with an electrolyte solution. However, in the present invention, carrying out the hydrophilizing treatment at a rate of not less than 10% and not more than 80% is one of the characteristics. Thus, at least a part of the separator shall not be hydrophilized, whereby the fluorine content that is contained in tetrafluoroethylene (TFE) constituting the separator and reacts with a dendrite will remain exposed. In this case, since the fluorine content that reacts with a dendrite remains exposed, this fluorine content certainly reacts with a dendrite to inhibit the growth of the dendrite. When the rate of the hydrophilizing treatment is less than 10%, the hydrophilicity is not sufficient, i.e., the ionic conductivity is not sufficient. In this case, a battery will have a high internal resistance, and the original battery performance cannot be obtained. On the other hand, when the rate of the hydrophilizing treatment is more than 80%, the fluorine content that reacts with an alkali metal dendrite is not sufficiently exposed, and the dendrite growth-inhibiting effect decreases.

Carrying out this hydrophilizing treatment at a rate of not less than 10% and not more than 80% can be controlled as appropriate by the method of hydrophilizing treatment mentioned below.

The method of hydrophilizing treatment is not particularly limited, and the method described in Japanese Patent No. 3463081, which is patented by the present applicant, may be used. The method, in summary, is a method in which a gelled product in the form of a solution formed by partial gelation reaction of a hydrolyzable metal-containing organic compound (for example, silicone alkoxide such as tetraethoxysilane) is attached to at least the microfibrils/micronodes or pore wall surface of a polymeric porous body having continuous pores to complete the gelation, thereby providing a structure of being covered with a metal oxide gel formed as a result of drying. For example, when silicone alkoxide such as tetraethoxysilane is used as a hydrolyzable metal-containing organic compound, hydrophilization can be achieved by covering with silica gel.

Alternatively, a hydrophilic polymer (for example, PVA or the like) may be impregnated into a porous body, and then dried for formation to provide a structure of being covered with the hydrophilic polymer.

The state of hydrophilization can be measured by various surface analysis methods, and, for example, tetrafluoroethylene (TFE) that has been subjected to a hydrophilizing treatment can be measured using a Field Emission-Scanning Electron Microscope (FE-SEM for short). The state of a porous structure can be confirmed on an electron micrograph. For example, the state of TFE having a hydrophilized layer of several nm to several tens of nm on its surface of nodes and fibrils while maintaining the porous structure can be confirmed. Further, the ratio of elements present on a sample surface can be measured using a composition analysis function of the electron microscope. Specifically, in the case of TFE ($C_2F_4$) before hydrophilizing treatment, the abundance ratio F and C is F/C=2:1 (66.7%:33.3%). Here, if SiOx is used as a hydrophilizing treatment material to cover TFE, Si and O are present on the sample surface. The rate of hydrophilization (the coverage by the hydrophilizing treatment material) can be determined from the ratio of F present on the surface after hydrophilizing treatment.

Further, the secondary battery of the present invention comprises a layer that does not react with a dendrite of the alkali metal between the negative electrode comprising alkali metal and the separator comprising a layer of tetrafluoroethylene (TFE) polymer or copolymer that reacts with a dendrite of the alkali metal. Otherwise, i.e., if the negative electrode comprising alkali metal and the separator that reacts with a dendrite of the alkali metal are brought into direct contact, the fluorine content in the separator (comprising the layer of tetrafluoroethylene (TFE) polymer or copolymer) reacts with the alkali metal of the negative electrode on the whole contacting surface, and defluoridation of the separator proceeds with or without the occurrence of a dendrite; as a result, high porosity, high strength, and heat resistance cannot be maintained. Namely, the function as a separator cannot be performed.

By inserting the layer that does not react with a dendrite between the negative electrode and the separator, direct contact between the separator that reacts with a dendrite and the negative electrode can be avoided.

The layer that does not react with a dendrite as well as the separator serves to prevent a short circuit by separating the positive electrode and the negative electrode and to ensure high ionic conductivity by retaining an electrolyte necessary for cell reaction. Thus, a material having high porosity, high strength, and excellent heat resistance is used. Therefore, a dendrite that starts to grow from the negative electrode grows through a hole in the layer that does not react with a dendrite. Since the layer that does not react with a dendrite does not react with a dendrite, its hole structure is soundly maintained even when a dendrite has grown. A dendrite passes through the hole in the layer that does not react with a dendrite and finally reaches the separator. Since the separator comprises a layer of tetrafluoroethylene (TFE) polymer or copolymer, the fluorine content contained in the separator reacts with a dendrite of the alkali metal, and the growth of a dendrite stops here. The time when and the place where a dendrite reaches the separator vary depending on the path of the hole in the layer that does not react with a dendrite, and reaction between a dendrite and the fluorine content in the separator occurs dispersedly in terms of time and place. Therefore, the situation where the function as a separator cannot be performed because of defluoridation, i.e., carbonization due to temporal and local reaction of the fluorine content in the separator with a dendrite is significantly prevented. This also solves the problem in that a dendrite penetrates the separator to cause a short circuit between the negative electrode and the positive electrode.

Here, the technical meaning of "layer that does not react with a dendrite" in the present invention is defined.

It is premised that "react with a dendrite" in the present invention means that an alkali metal dendrite reacts with fluorine contained in a tetrafluoroethylene (TFE) polymer or copolymer exclusively according to the following formula.

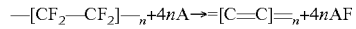

In the formula, A means alkali metal.

In contrast, "layer that does not react with a dendrite" means that the layer substantially does not react with a dendrite, i.e., does not substantially undergo defluoridation. "Not substantially undergo defluoridation" means that defluoridation does not proceed to the extent that the structure of the layer cannot be maintained. As mentioned below, the layer that does not react with a dendrite in the present invention may contain a fluorine-containing substance such as pVDF. Fluorine contained in pVDF can slightly react with alkali metal of a dendrite, but defluoridation cannot proceed to the extent that the structure of the layer that does not react with the dendrite cannot be maintained. Thus, it should be noted that "layer that does not react with a dendrite" in the present invention should not be interpreted restrictively to mean that fluorine does not react with a dendrite at all. Needless to say, when the layer that does not react with a dendrite does not contain fluorine, reaction with a dendrite naturally cannot occur.

In the present invention, the standard deviation of opening areas of pores on the negative electrode side surface of the layer that does not react with a dendrite is 0.1 $\mu m^2$ or less.

In this case, surprisingly, the number of charge and discharge cycles of the battery before a short circuit between the negative electrode and the positive electrode occurs dramatically improves.

While not wishing to be bound by any particular theory, the following mechanism is possible. During charging, lithium ions precipitate on the negative electrode surface, and dendrites grow through pores of the layer that does not react with a dendrite. When the dispersion (standard deviation) of opening areas of pores is small as specified in the present invention, in other words, the uniformity of opening areas of pores is high, dendrites grow substantially uniformly and slowly from the negative electrode surface through pores of the layer that does not react with a dendrite. Thus, dendrites do not grow temporarily and locally. A short circuit, if temporarily and locally, is fatal to the battery. When the standard deviation of opening areas of pores is more than 0.1 $\mu m^2$, dendrites can grow nonuniformly. In the ununiform growth, some dendrites grow more than average. The dendrites that have grown more than average come closer to the separator and have a larger surface area (as compared to other dendrites that have grown averagely), which increases the possibility that the precipitation (growth) of dendrites accelerates. Consequently, local or temporary growth of dendrites proceeds, which increases the possibility that a short circuit finally occurs. In the present invention, the standard deviation of opening areas of pores is 0.1 $\mu m^2$ or less, whereby the possibility of a short circuit can be significantly reduced.

The standard deviation of opening areas of pores can be determined as described below. First, the negative electrode side surface of the layer that does not react with a dendrite is photographed with an electron microscope or the like; the opening area of each pore is measured from an image obtained; and its standard deviation is calculated.

Further, in the present invention, on the negative electrode side surface of the layer that does not react with a dendrite, pores having an opening area of less than 0.2 $\mu m^2$ may be 75% or more based on the total number of the pores. When pores having an opening area of less than 0.2 $\mu m^2$ account for 75% or more of the total pores, it means that fine-textured pores are fully provided. If pores having an opening area of 0.2 $\mu m^2$ or more exist in an amount of more than 25% of the total pores, the pores having a relatively large opening increases the possibility that the growth of dendrites proceeds locally and temporarily, increasing the risk of occurrence of a short circuit.

The opening areas of pores can be determined from an image of the negative electrode side surface of the layer that does not react with a dendrite taken with an electron microscope or the like. Thus, the opening area of each pore and the number of pores obtained are compiled, and the ratio of the number of pores in a given range of opening areas to the total number of pores can be determined.

The layer that does not react with a dendrite of the alkali metal may be hydrophilized.

The hydrophilization can provide the characteristic of not reacting with a dendrite of the alkali metal or improve the characteristic. This is probably because a hydrophilic group or hydrophilic substance is attached to the inner surface of pores of the layer that does not react with a dendrite and this hydrophilic group or hydrophilic substance does not react with a dendrite.

The hydrophilizing treatment applied to the separator mentioned above may be applied to the layer that does not react with a dendrite. Even if the layer that does not react with a dendrite is a part of the separator and contains the fluorine content that reacts with a dendrite, the fluorine content that reacts with a dendrite can be covered with a hydrophilic group or hydrophilic substance by progressing the hydrophilizing treatment of the inner surface of its pores, so that a reaction with a dendrite will not occur there. In other words, the hydrophilizing treatment can provide a layer that does not react with a dendrite.

As the positive electrode constituting the battery, any conventional material known or well-known as a positive electrode for a lithium secondary battery can be used.

Although the material used as a positive electrode in the secondary battery of the present invention is not particularly limited, metal chalcogenides, which are able to occlude and release alkali metal ions such as sodium ions and lithium ions during charging and discharging, and the like are preferred. Examples of such metal chalcogenides include oxides of vanadium, sulfides of vanadium, oxides of molybdenum, sulfides of molybdenum, oxides of manganese, oxides of chromium, oxides of titanium, sulfides of titanium, and complex oxides and complex sulfides thereof. Examples of such compounds include $Cr_3O_8$, $V_2O_5$, $V_5O_{18}$, $VO_2$, $Cr_2O_5$, $MnO_2$, $TiO_2$, $MoV_2O_8$, $TiS_2V_2S_5MoS_2$, $MoS_3VS_2$, $Cr_{0.25}V_{0.75}S_2$, $Cr_{0.5}V_{0.5}S_2$, and the like. Further, $LiMY_2$ (M is a transition metal such as Co and Ni, and Y is a chalcogenide such as O and S), $LiM_2Y_4$ (M is Mn, and Y is O), oxides such as $WO_3$, sulfides such as CuS, $Fe_{0.25}V_{0.75}S_2$, and $Na_{0.1}CrS_2$, phosphorus-sulfur compounds such as $NiPS_8$ and $FePS_8$, selenium compounds such as $VSe_2$ and $NbSe_3$, iron compounds such as iron oxides, and the like can also be used. Further, manganese oxides and lithium/manganese complex oxide having a spinel structure are also preferred.

More specific examples of the material include $LiCoO_2$, $LiCo_{1-x}Al_xO_2$, $LiCo_{1-x}Mg_xO_2$, $LiCo_{1-x}Zr_xO_2$, $LiMn_2O_4$, $Li_{1-x}Mn_{2-x}O_4$, $LiCr_xMn_{2-x}O_4$, $LiFe_xMn_{2-x}O_4$, $LiCo_xMn_{2-x}O_4$, $LiCu_xMn_{2-x}O_4$, $LiAl_xMn_{2-x}O_4$, $LiNiO_2$, $LiNi_xMn_{2-x}O_4$, $Li_6FeO_4$, $NaNi_{1-x}Fe_xO_2$, $NaNi_{1-x}Ti_xO_2$, $FeMoO_4Cl$, $LiFe_5O_8$, $FePS_3$, $FeOCl$, $FeS_2$, $Fe_2O_3$, $Fe_3O_4$, β-FeOOH, α-FeOOH, γ-FeOOH, α-$LiFeO_2$, α-$NaFeO_2$, $LiFe_2(MoO_4)_3$, $LiFe_2(WO_4)_3$, $LiFe_2(SO_4)_3$, $Li_3Fe_2(PO_4)_3$, $Li_3Fe_2(AsO_4)_3$, $Li_3V_2(AsO_4)_3$, $Li_3FeV(AsO_4)_3$, $Li_{1.5}Al_{0.5}Ge_{1.5}(PO_4)_3$, $LiFePO_4$, $Li_2FeSiO_4$, $FeBO_3$, $FeF_3$, and the like.

In the separator between the positive electrode and the negative electrode, an electrolyte solution is retained. As the electrolyte solution, for example, an alkali metal salt such as a sodium salt or a lithium salt dissolved in a nonaqueous organic solvent is used. The electrolyte solution is not particularly limited as long as it has good ionic conductivity and negligible electrical conductivity, and any conventional material known or well-known as an electrolyte solution for a lithium secondary battery can be used.

Examples of nonaqueous solvents that can be used for the electrolyte solution of the secondary battery of the present invention include acetonitrile (AN), γ-butyrolactone (BL), γ-valerolactone (VL), γ-octanoic lactone (OL), diethyl ether (DEE), 1,2-dimethoxyethane (DME), 1,2-diethoxyethane (DEE), dimethyl sulfoxide (DMSO), 1,3-dioxolane (DOL), ethylene carbonate (EC), propylene carbonate (PC), dimethyl carbonate (DMC), diethyl carbonate (DEC), ethyl methyl carbonate (EMC), methyl formate (MF), tetrahydrofuran (THF), 2-methyltetrahydrofuran (MTHF), 3-methyl-1,3-oxaziridin-2-one (MOX), sulfolane (S), and the like, which can be used alone or as a mixture of two or more thereof.

Examples of the alkali metal salt, particularly, the lithium salt used for the electrolyte solution of the secondary battery include lithium salts such as $LiPF_6$, $LiAsF_6$, $LiClO_4$, $LiBF_4$, LiCF$_3$SO$_3$, Li(CF$_3$SO$_2$)$_2$N, and LiC$_4$F$_9$SO$_3$, and one, or two or more of them are dissolved in the nonaqueous solvent described above at a concentration of about 0.5 to 2.0 M to obtain a nonaqueous electrolyte solution.

In one aspect of the present invention, the layer that does not react with a dendrite of the alkali metal may be a part of the separator, and, in the layer that does not react with a dendrite of the alkali metal, the inner surface of its pores may be at least partially covered with a material that does not react with a dendrite.

In this aspect, in a part of the separator, the inner surface of its pores is at least partially covered with a material that does not react with a dendrite, and this part is defined as a layer that does not react with a dendrite of the alkali metal. As mentioned above, the separator comprises a layer of tetrafluoroethylene (TFE) polymer or copolymer, and the fluorine content contained in this layer reacts with a dendrite. However, in this aspect, since the layer of tetrafluoroethylene (TFE) polymer or copolymer, i.e., the fluorine content contained in this layer is covered with a material that does not react with a dendrite, a reaction between the fluorine content and a dendrite does not occur in this area, and this area can be a layer that does not react with a dendrite of the alkali metal.

According to this aspect, since a part of the separator is only at least partially covered with a material that does not react with a dendrite, the number of parts of the battery is reduced, which is advantageous in assembling a secondary battery.

In another aspect, the layer that does not react with a dendrite of the alkali metal may be independent of the separator.

According to this aspect, the above-mentioned step of covering a part of the separator with a material that does not react with a dendrite is not necessary.

The layer that is independent of the separator and does not react with a dendrite of the alkali metal may comprise any one of glass comprising SiO$_X$ (0<x≤2), polyvinylidene fluoride (PVDF), polyimide (PI), polyethylene (PE), or polypropylene (PP) or a mixture thereof. These materials do not cause a reaction with a dendrite of the alkali metal. In addition, these materials allow appropriate preparation of one having high porosity, high strength, and heat resistance. Although polyvinylidene fluoride (PVDF) contains fluorine content, a reaction between the fluorine content and a dendrite of the alkali metal will not occur to progress defluoridation, i.e., carbonization. While not wishing to be bound by any particular theory, this is probably because polyvinylidene fluoride (PVDF) also contains hydrogen content and defluoridation caused by direct reaction between the alkali metal and the fluorine content is suppressed, or because hydrogen remains even after fluorine reacted with the alkali metal and carbonization is suppressed.

The layer that is independent of the separator and does not react with a dendrite of the alkali metal may comprise any one of inorganic oxides selected from the group consisting of alumina, titanium oxide, sodium oxide, calcium oxide, boron oxide, potassium oxide, and lead oxide or a mixture thereof and a binder. These materials also do not cause a reaction with a dendrite of the alkali metal. In addition, these materials also allow appropriate preparation of one having high porosity, high strength, and heat resistance.

Regardless of whether the layer that does not react with a dendrite of the alkali metal is a part of the separator or independent of the separator, the inner surface of its pores may be covered with a material other than tetrafluoroethylene (TFE) polymer or copolymer.

The fluorine content contained in tetrafluoroethylene (TFE) cause a reaction with a dendrite of the alkali metal. Materials other than tetrafluoroethylene (TFE) are less likely to react with a dendrite and able to further enhance the function of not reacting with a dendrite in the layer that does not react with a dendrite has.

The method of covering a material is not particularly limited, and a conventional method can be appropriately used depending on the material. A material to be applied may be brought into solution for impregnation. For example, any method may be used such as vacuum pressure impregnation, vacuum impregnation, spraying, evaporation to dryness, metering bar method, die coating method, gravure method, reverse roll method, doctor blade method, knife coating method, and bar coating method.

Further, even when a solution is only applied to the inner surface of pores, the solution fills a space. Namely, "impregnation" herein only requires filling of a space of pores with a solution and is a concept including application and the like.

The application method is not particularly limited, and, for example, any method such as metering bar method, die coating method, gravure method, reverse roll method, and doctor blade method may be used.

As a method of covering, chemical modification and physical modification may be used. Examples of the chemical modification include the method of adding a functional group to the inner surface of pores by acetylation, isocyanation, acetalization, or the like, the method of covering the inner surface of pores with organic matter or inorganic matter by chemical reaction, and the like. Examples of the physical modification include, physical vapor deposition such as vacuum deposition, ion plating, and sputtering, chemical vapor deposition, plating methods such as electroless plating and electrolytic plating, and the like. These methods for covering may be used alone, or two or more thereof may be used in combination.

When the layer that does not react with a dendrite is a part of the separator, to enhance the binding force between a material to be applied and a material to be covered (the raw material is tetrafluoroethylene (TFE)), if the inner surface of pores of the material to be covered (corresponding to the layer that does not react with a dendrite in a secondary battery) is subjected to a chemical treatment (alcohol substitution treatment, alkali treatment, or the like) or a physical treatment (corona treatment, plasma treatment, UV treatment, or the like) as a pretreatment to attach a surface functional group to an F—C bond at the inner surface of pores of the material to be covered, the adhesive strength will be enhanced.

The material other than tetrafluoroethylene (TFE) polymer or copolymer applied to the inner surface of pores of the layer that does not react with a dendrite may be any one of glass comprising SiO$_X$ (0<x≤2), polyvinylidene fluoride (PVDF), polyimide (PI), polyethylene (PE), or polypropylene (PP) or a mixture thereof. These materials do not cause a reaction with a dendrite of the alkali metal. In addition, these materials allow appropriate preparation of one having high strength and heat resistance. Further, these materials can be applied to the inner surface of pores of the layer that does not react with a dendrite as appropriate (without blocking the pores) and are also able to maintain the high porosity of the layer that does not react with a dendrite as appropriate.

SiO$_X$ (0<x≤2) may be applied by Sol-Gel method. In the Sol-Gel method, starting from molecules having a hydrolyzable group, condensation is carried out to form particles dissolved in the form of colloidal dispersion (sol). The sol generally can be used as a liquid coating material by not completing the condensation reaction. A structure (gel) is formed by condensation after applied, and is built up to desired level in the pores. In this condensation, any other cross-linking mechanism (e.g., polymerization of organic functional groups) may optionally be used. The gel is heat-treated or vacuum-treated to thereby remove the solvent remaining inside, further promoting densification. In this way, $SiO_X$ (0<x≤2) can be applied to the internal surface of the pores. The Sol-Gel method allows for easy production at a low temperature as compared to other methods (e.g., molten glass method, powder sintering method). Further, by utilizing chemical reaction, organic matter and inorganic matter can be composited since the production at a low temperature is possible.

The tetrafluoroethylene (TFE) polymer or copolymer constituting the separator and the layer that does not react with a dendrite may be expanded or expanded porous.

Expanded porous membranes of tetrafluoroethylene (TFE) polymer or copolymer have been hitherto studied so much, and membranes with high porosity and high strength have been obtained. Tetrafluoroethylene (TFE) polymer or copolymer is known to have high crystallinity and have high strength by itself. An expanded porous membrane of tetrafluoroethylene (TFE) polymer or copolymer is suitably obtained by expanding a precursor formed by melt fusion of fine powders of tetrafluoroethylene (TFE) polymer or copolymer (see each description of JP 56-45773 B, JP 56-17216 B, and U.S. Pat. No. 4,187,390). By controlling the fusion conditions of fine powders of tetrafluoroethylene (TFE) polymer or copolymer or the expanding conditions of a precursor, a membrane with high porosity and high strength can be produced. In addition, tetrafluoroethylene (TFE) polymer or copolymer has a high melting point and is advantageous in that it does not melt even at 250° C. or higher.

More specifically, an expanded porous membrane of tetrafluoroethylene (TFE) polymer or copolymer is obtained in such a manner that a paste-like formed body obtained by mixing fine powders of tetrafluoroethylene (TFE) polymer or copolymer with a forming assistant is expanded after removing or without removing the forming assistant therefrom and optionally baked. In the case of uniaxial expanding, fibrils are oriented in the expanding direction, and, at the same time, a fibrous structure having holes between the fibrils is provided. In the case of biaxial expanding, fibrils spread radially, and a web-like fibrous structure is provided in which a number of holes defined by nodes and fibrils are present.

The porosity can be controlled by expanding as appropriate. The porosity is not particularly restricted as long as the electrolyte solution can be retained in the battery, and it may be preferably 30% or more, more preferably 60% or more, and still more preferably 80% or more in order to ensure impregnating ability and permeability. The porosity of the porous membrane can be calculated from an apparent density p measured in accordance with the method for measuring apparent density defined in JIS K 6885 using the following equation. (The following equation is for determining the porosity of PTFE as an example. Accordingly, the true density of PTFE is taken as 2.2. The value of the true density is adjusted depending on the material constituting the porous membrane.)

$$\text{Porosity (\%)}=[(2.2-\rho)/2.2]\times 100$$

The thickness of the porous membrane (the separator and the layer that does not react with a dendrite) is not particularly restricted and may be determined as appropriate depending on the application. In the case of those which are arranged between the electrodes, it may be preferably from 1 µm to 1000 µm. When the thickness is less than 1 µm, handling can be difficult because of insufficient strength, and, on the other hand, when it is more than 1000 µm, it can be difficult to uniformly impregnate the electrolyte solution. The thickness of the porous membrane arranged between the electrodes is more preferably from 10 µm to 500 µm and still more preferably from 20 µm to 200 µm.

This tetrafluoroethylene (TFE) polymer or copolymer is not particularly limited as long as it has high porosity, high strength, and heat resistance and can react with a dendrite of the alkali metal. More specifically, the tetrafluoroethylene (TFE) polymer or copolymer may be expanded polytetrafluoroethylene, perfluoro alkoxy alkane (PFA), tetrafluoroethylene/hexafluoropropene copolymer (FEP), ethylene/tetrafluoroethylene copolymer (ETFE), or ethylene/chlorotrifluoroethylene copolymer (ECTFE) or a mixture thereof.

The thickness of the layer that does not react with a dendrite of the alkali metal may be 0.1 µm or more.

A dendrite starts to grow from the negative electrode, passes through the hole in the layer that does not react with a dendrite, and finally reaches the separator. To disperse the time when and the place where a dendrite reaches the separator so that the fluorine content in the separator will not temporally and locally react with a dendrite to cause defluoridation, i.e., carbonization, it is preferable to adjust the layer that does not react with a dendrite of the alkali metal to have an appropriate thickness. When the thickness is as described above, the time when and the place where a dendrite reaches the separator will be sufficiently dispersed. To further ensure the dispersion, the thickness of the layer may be preferably not less than 1.0 µm and more preferably not less than 10 There is no particular upper limit on the thickness of the layer, and the thickness can be set as appropriate from the standpoint of reducing the space for the secondary battery.

The separator may at least comprise fluorine that can react with the total mass of the alkali metal constituting the negative electrode.

If by any chance all the alkali metals constituting the negative electrode react with the separator, the reaction of the alkali metal constituting the negative electrode will complete in the separator because the separator comprises fluorine that can react with the total mass of the alkali metal constituting the negative electrode. Therefore, a short circuit from the negative electrode to the positive electrode due to penetration of a dendrite through the separator can be certainly prevented.

The alkali metal constituting the negative electrode may be lithium or sodium.

That is because metallic lithium has a very high theoretical energy density (3861 mAh/g by weight capacity density) and a low charge/discharge potential (−3.045 V vs. SHE) and thus is considered to be an ideal negative electrode material. Metallic sodium also has a high theoretical energy density and a low charge/discharge potential. Although lithium or sodium has been reported to grow as a dendrite, the present invention can inhibit such growth of a dendrite.

The secondary battery according to the present invention may further include a shutdown layer.

The shutdown layer is a layer having a shutdown function. The shutdown function is a function of blocking a current when the temperature of the battery is elevated, i.e., a function of arresting thermal runaway of the battery. For example, the shutdown layer may be, but is not limited to, a layer having micropores, the melting point of which is relatively low such that the micropores are blocked when the temperature of the battery is elevated to a certain temperature or higher. For example, a polyolefin, in particular, polyethylene microporous membrane may be used as the shutdown layer. The shutdown layer may be not only a membrane but also nanofiber web, fiber web, or the like. In addition to those mentioned above, the shutdown layer may be those which include heat-reactive microspheres or a PTC element.

The shutdown layer may be located between the separator and the positive electrode.

Since the shutdown layer is intended to block a current, it may be located anywhere between the positive electrode and the negative electrode in the secondary battery, and the shutdown layer may be located between the separator and the positive electrode. In this case, even if by any chance a dendrite should continue to grow, penetrate the separator, and reach the shutdown layer, heat generation due to defluoridation reaction between the dendrite (alkali metal) and the separator (TFE) will cause the shutdown layer to melt to achieve blocking. Thus, a short circuit between the negative electrode and the positive electrode due to penetration of a dendrite through the separator can be certainly prevented.

The present invention also relates to a separator used in the secondary battery described above.

Examples

The present invention will now be described specifically by way of example, but the present invention is not limited by them.

In the Examples, various coin cells were produced under the conditions shown in Table 1. These coin cells were used to perform a charge-discharge test (coin cell cycle by Li/Li), calculate the number of cycles until an internal short-circuit due to a Li dendrite occurs, and evaluate the life of each coin cell. A description will now be given in more detail.

TABLE 1

| | Separator Material | Covering Material or Laminating Material | Internal Exposed Rate % | Surface Coverage % |
|---|---|---|---|---|
| Example 1 | PTFE | SiOx | 50 | 95 |
| Example 2 | PTFE | SiOx | 70 | 95 |
| Example 3 | PTFE | SiOx | 90 | 95 |
| Example 4 | PTFE | SiOx | 30 | 95 |
| Example 5 | PTFE | SiOx | 20 | 95 |
| Example 6 | PTFE | PVDF | 50 | 95 |
| Example 7 | PTFE | PI | 50 | 95 |
| Example 8 | PTFE | PE laminate | 50 | — |
| Example 9 | PTFE | PP laminate | 50 | — |
| Comparative Example 1 | PE | — | — | — |
| Comparative Example 2 | PP/PE/PP | — | — | — |
| Comparative Example 3 | Glass fiber cloth | — | — | — |
| Comparative Example 4 | PTFE | — | 60 | — |

As a separator, a PTFE membrane (available from W. L. Gore & Associates, Inc.) was employed in Examples 1 to 9 and Comparative Example 4. In Comparative Example 1 to Comparative Example 3, generally available porous membranes shown in Table 1 were employed. In all the Examples, the membrane thickness, except for a glass fiber cloth was about 25 μm, and the porosity was near about 50%. The membrane thickness of the glass fiber cloth was 100

In Examples 1 to 9 and Comparative Example 4, silica was used to hydrophilize the separator. In particular, in Examples 1 to 5, the rate of hydrophilization was varied between 10% and 80% (20% to 90% in terms of internal exposed rate). One hundred parts of tetraethoxysilane (available from Shin-Etsu Silicone), 52 parts of water, and 133 parts of ethanol were allowed to react at 80° C. for 24 hours under reflux where the moisture from the outside air is blocked using a calcium chloride tube to prepare a partially gelled solution of metal oxide precursor. The PTFE membrane described above was impregnated with a diluent of this solution, and then immersed in warm water at 60° C. to complete the gelation. This was dried in a thermostat bath at 150° C. for 30 minutes to obtain a separator whose exposed surface including the inner surface of a porous body was covered with silica gel and hydrophilized. The rate of hydrophilization was adjusted with the dilution rate of the partially gelled solution of metal oxide precursor.

In Examples 1 to 9, as a layer that does not react with a dendrite, the covering material or laminated material shown in Table 1 was provided between the separator and the negative electrode.

In Examples 1 to 5, the separator was coated with SiOx (glassy substance) as a layer that does not react with a dendrite.

An SiOx coating agent (New Technology Creating Institute Co., Ltd., SIRAGUSITAL B4373 (A), solid content: 60%) was dissolved in an IPA solvent to adjust the solid content concentration of the SiOx coating agent to 5%.

A porous PTFE film having a thickness of 25 μm was coated only on the surface layer with the SiOx coating agent subjected to the concentration adjustment described above by the gravure coating method.

For the dry conditions, after preliminary drying at 60° C. for 1 hr, curing was carried out in the environment at room temperature of 25° C. and 60% (relative humidity) for 96 hr.

The thickness of the layer that does not react with a dendrite was 0.2 μm. The thickness was determined by observing the thickness of the SiOx layer on the PTFE membrane (separator) surface using a transmission electron microscope (TEM).

In Example 6, PVDF (maker: ARKEMA, specification: KYNAR710) was dissolved in a given organic solvent to a given concentration, and the resultant was applied and dried in the same manner as in Example 1.

In Example 7, PI (maker: Hitachi Chemical Co., Ltd., specification: HCI) dissolved in a given organic solvent was applied, dried, and cured in the same manner as in Example 1.

In Example 8, as a layer that does not react with a dendrite, a PE porous membrane (membrane thickness: 25 μm, porosity: 50%) was laminated on the separator.

In Example 9, as a layer that does not react with a dendrite, a PP porous membrane (membrane thickness: 25 μm, porosity: 50%) was laminated on the separator.

For the hydrophilized separators in Examples 1 to 9 and Comparative Example 4, to what extent the inner surface of pores was covered with silica was measured. The results are expressed as Internal Exposed Rate in Table 1. Here, Internal Exposed Rate (%)=100−Coverage (%). The coverage (%) of silica corresponds to the rate of hydrophilizing treatment. In Example 1, as shown in Table 1, 50% of the inner surface of pores was covered with silica, and the internal exposed rate was 50%. In measuring the coverage (internal exposed rate), X-ray Photoelectron Spectrometer JPS-92005 for microanalysis manufactured by JEOL Ltd. was used. The measurement conditions were as follows: filament current: 4.5 A; and accelerating voltage: 4.0 eV. This apparatus was used to quantitatively determine the amount of F, O, C, and Si on the pore inner surface. In the case of the PTFE before being covered with silica, F/C=2:1 (66.7:33.3%). Based on this ratio, the coverage of silica was calculated from the ratio of the surface F quantitated.

For the areas covered with the covering material of Examples 1 to 7 (corresponding to the layer that does not react with a dendrite), to what extent the inner surface of its pores was covered with the covering material was measured. The results were as shown in Table 1, and 95% of the inner surface of the pores was covered with the covering material. The measurement method was similar to the above.

<Production of Coin Cell>

As an electrode, two pieces of Li of ϕ 14 mm and a thickness of 100 μm were provided (8.21 mg, 31.7 mAh). The separators and the layers that do not react with a dendrite in Examples 1 to 9 and Comparative Examples 1 to 4 were formed into ϕ 17 mm. As an electrolyte solution, 1 moldm$^{-3}$ LiPF$_6$/EC:PC=1:1 was provided. These members were incorporated into a 2032 coin cell available from Hohsen Corp. in a glove box to produce a coin cell of FIG. 1.

<Charge-Discharge Test>

This coin cell was used to perform a charge-discharge test (coin cell cycle by Li/Li). The charge and discharge measurement was carried out using a battery charge and discharge apparatus (HJ1001SM8A) manufactured by HOKUTO DENKO CORP. A charge-discharge test at a current density of 10 mA/cm$^2$ for 30 minutes (DOD: depth of discharge, about 25%) was repeated. The number of cycles until an internal short-circuit occurs due to a dendrite was calculated. The results are shown in Table 2.

TABLE 2

Cycle test result

| Separator Material | Covering Material or Laminating Material | The Number of Cycles Before Short Circuit Number |
|---|---|---|
| Example 1 | PTFE | SiOx | 1000 or more |
| Example 2 | PTFE | SiOx | 1000 or more |
| Example 3 | PTFE | SiOx | 1000 or more |
| Example 4 | PTFE | SiOx | 1000 or more |
| Example 5 | PTFE | SiOx | 1000 or more |
| Example 6 | PTFE | PVDF | 1000 or more |
| Example 7 | PTFE | PI | 1000 or more |
| Example 8 | PTFE | PE laminate | 1000 or more |
| Example 9 | PTFE | PP laminate | 1000 or more |
| Comparative Example 1 | PE | — | 110 |
| Comparative Example 2 | PP/PE/PP | — | 145 |
| Comparative Example 3 | Glass fiber cloth | — | 35 |
| Comparative Example 4 | PTFE | — | 200 |

As shown in Table 2, in every case of having a separator that reacts with a dendrite and a layer that does not react with a dendrite in Examples 1 to 9, the number of cycles before a short circuit is 1000 or more. On the other hand, in the cases of not having a layer that does not react with a dendrite in Comparative Examples 1 to 4, the number of cycles before a short circuit dramatically decreased.

It was confirmed that the secondary battery of the present invention is able to inhibit the growth of a dendrite that can generate from an electrode comprising alkali metal.

Further, the effect of the properties (standard deviation, opening area ratio) of opening areas of pores on the number of cycles before a short circuit was investigated.

A coin cell was produced in the same manner as in Example 1, and the charge-discharge test was repeated until an internal short-circuit occurs. The opening areas of pores on the negative electrode side surface of the layer that does not react with a dendrite were as shown in Table 3.

TABLE 3

Properties of opening area and the number of cycles before short circuit

| Sample | Standard deviation | Ratio of pores having opening area less than 0.2 μm$^2$ | Number of cycles before short circuit |
|---|---|---|---|
| A | 0.01 | 100 | 1400 |
| B | 0.02 | 95 | 1200 |
| C | 0.05 | 80 | 500 |
| D | 0.1 | 70 | 300 |
| E | 0.1 | 50 | 200 |
| F | 0.25 | 50 | 120 |
| G | 0.25 | 70 | 180 |
| H | 0.5 | 40 | 100 |
| I | 0.6 | 50 | 60 |
| J | 1 | 30 | 20 |

Figure 2:
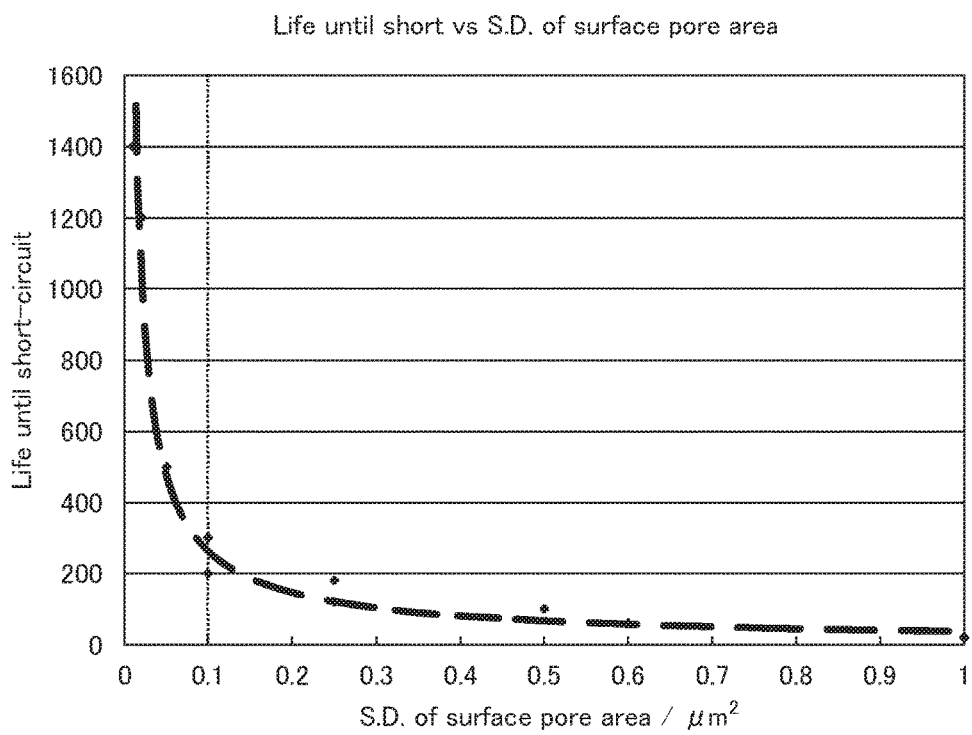
FIG. 2 is a graph showing the relationship between the standard deviation of opening areas and the number of cycles before a short circuit.

FIG. 2 is a graph showing the relationship between the standard deviation of opening areas and the number of cycles before a short circuit. As the standard deviation of opening areas decreased, the number of cycles before a short circuit increased. Where the standard deviation of opening areas falls below about 0.3 μm$^2$, the rate of increase of the number of cycles before a short circuit started to rise. In particular, where the standard deviation of opening areas falls below about 0.1 μm$^2$, the number of cycles before a short circuit significantly increased. As the standard deviation decreased to 0.05 μm$^2$ or less, 0.02 μm$^2$ or less, and 0.01 μm$^2$ or less, the number of cycles before a short circuit steeply increased.

Figure 3:
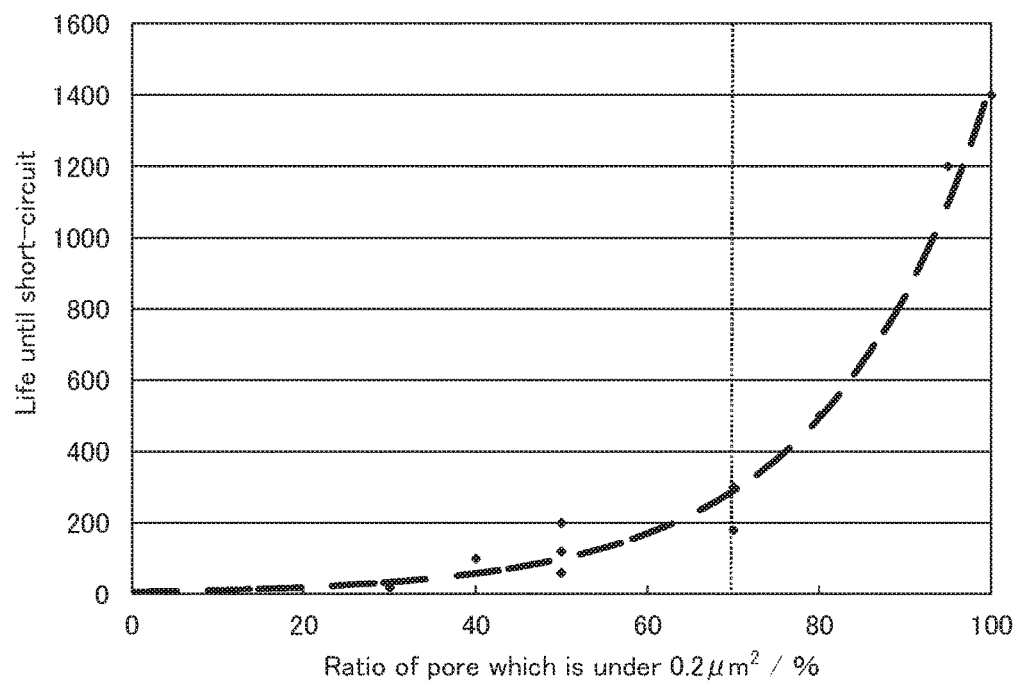
FIG. 3 is a graph showing the relationship between the ratio of pores having a specific opening area and the number of cycles before a short circuit.

FIG. 3 is a graph showing the relationship between the ratio of pores having an opening area of less than 0.2 μm$^2$ and the number of cycles before a short circuit. As the ratio of such pores increased, the number of cycles before a short circuit increased. Where the ratio of such pores is about 40%, the rate of increase of the number of cycles before a short circuit started to rise. In particular, where the ratio of such pores exceeds about 70%, the number of cycles before a short circuit significantly increased. As the ratio of pores increased to 80% or more, 95% or more, and 100%, the number of cycles before a short circuit steeply increased.

The invention claimed is:

1. A secondary battery, comprising:
   a positive electrode;
   a negative electrode comprising alkali metal;
   a separator comprising a layer of tetrafluoroethylene (TFE) polymer or copolymer that reacts with a dendrite of the alkali metal, the separator being hydrophilized at a rate of not less than 10% and not more than 80%; and
   a layer that does not react with a dendrite of the alkali metal located between the separator and the negative electrode, wherein the standard deviation of opening areas of pores on the negative electrode side surface of the layer that does not react with a dendrite of the alkali metal is 0.1 µm² or less.

2. The secondary battery according to claim 1, wherein on the negative electrode side surface of the layer that does not react with a dendrite of the alkali metal, pores having an opening area of less than 0.2 µm² account for 75% or more of the total number of the pores.

3. The secondary battery according to claim 1, wherein the layer that does not react with a dendrite of the alkali metal is hydrophilized.

4. The secondary battery according to claim 1, wherein the layer that does not react with a dendrite of the alkali metal is a part of the separator, and, in the layer that does not react with a dendrite of the alkali metal, the inner surface of its pores is at least partially covered with a material that does not react with a dendrite of the alkali metal.

5. The secondary battery according to claim 1, wherein the layer that does not react with a dendrite of the alkali metal is independent of the separator.

6. The secondary battery according to claim 5, wherein the layer that does not react with a dendrite of the alkali metal comprises any one of glass comprising SiOx ($0<x\leq2$), polyvinylidene fluoride (PVDF), polyimide (PI), polyethylene (PE), or polypropylene (PP) or a mixture thereof.

7. The secondary battery according to claim 5, wherein the layer that does not react with a dendrite of the alkali metal comprises any one of inorganic oxides selected from the group consisting of alumina, titanium oxide, sodium oxide, calcium oxide, boron oxide, potassium oxide, and lead oxide or a mixture thereof and a binder.

8. The secondary battery according to claim 1, wherein in the layer that does not react with a dendrite of the alkali metal, the inner surface of its pores is covered with a material other than tetrafluoroethylene (TFE) polymer or copolymer.

9. The secondary battery according to claim 8, wherein the material other than tetrafluoroethylene (TFE) polymer or copolymer is any one of glass comprising SiOx ($0<x\leq2$), polyvinylidene fluoride (PVDF), polyimide (PI), polyethylene (PE), or polypropylene (PP) or a mixture thereof.

10. The secondary battery according to claim 9, wherein SiOx ($0<x\leq2$) is applied by Sol-Gel method.

11. The secondary battery according to claim 1, wherein the tetrafluoroethylene (TFE) polymer or copolymer is expanded or expanded porous.

12. The secondary battery according to claim 1, wherein the tetrafluoroethylene (TFE) polymer or copolymer is expanded polytetrafluoroethylene, perfluoro alkoxy alkane (PFA), tetrafluoroethylene/hexafluoropropene copolymer (FEP), ethylene/tetrafluoroethylene copolymer (ETFE), or ethylene/chlorotrifluoroethylene copolymer (ECTFE) or a mixture thereof.

13. The secondary battery according to claim 1, wherein the thickness of the layer that does not react with a dendrite of the alkali metal is 0.1 µm or more.

14. The secondary battery according to claim 1, wherein the separator at least comprises fluorine that can react with the total mass of the alkali metal constituting the negative electrode.

15. The secondary battery according to claim 1, wherein the alkali metal is lithium or sodium.

16. The secondary battery according to claim 1, further comprising a shutdown layer.

17. The secondary battery according to claim 16, wherein the shutdown layer is located between the separator and the positive electrode.

18. The separator used in the secondary battery according to claim 1.

* * * * *

UNITED STATES PATENT AND TRADEMARK OFFICE
CERTIFICATE OF CORRECTION

PATENT NO. : 10,181,593 B2  
APPLICATION NO. : 15/314212  
DATED : January 15, 2019  
INVENTOR(S) : Kobayashi Page 1 of 1

It is certified that error appears in the above-identified patent and that said Letters Patent is hereby corrected as shown below:

On the Title Page

Item [*], 14/363713 filing date: June 6, 2014 should read 14/44090 filing date: November 14, 2013.

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*